United States Patent
Campbell (10) Patent No.: US 7,243,173 B2
(45) Date of Patent: Jul. 10, 2007

(54) LOW PROTOCOL, HIGH SPEED SERIAL TRANSFER FOR INTRA-BOARD OR INTER-BOARD DATA COMMUNICATION

(75) Inventor: Alan J. Campbell, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 165 days.

(21) Appl. No.: 11/011,964

(22) Filed: Dec. 14, 2004

(65) Prior Publication Data

US 2006/0129722 A1    Jun. 15, 2006

(51) Int. Cl.
*G06F 13/38* (2006.01)
(52) U.S. Cl. ....................................................... 710/71
(58) Field of Classification Search .................. 710/71
See application file for complete search history.

(56) References Cited

U.S. PATENT DOCUMENTS

| | | | | |
|---|---|---|---|---|
| 3,395,400 | A * | 7/1968 | De Witt et al. ............. | 341/100 |
| 3,708,785 | A * | 1/1973 | Rawson et al. ............... | 710/45 |
| 4,497,041 | A * | 1/1985 | Braun ......................... | 710/71 |
| 4,710,871 | A * | 12/1987 | Belknap et al. ............. | 709/237 |
| 4,809,217 | A * | 2/1989 | Floro et al. .................... | 710/52 |
| 4,882,702 | A * | 11/1989 | Struger et al. ................. | 710/2 |
| 5,122,948 | A * | 6/1992 | Zapolin ..................... | 340/3.53 |
| 5,247,652 | A * | 9/1993 | Uda ............................. | 710/71 |
| 5,345,564 | A * | 9/1994 | Jensen et al. ................ | 713/600 |
| 5,414,830 | A * | 5/1995 | Marbot ........................ | 710/71 |
| 5,649,124 | A * | 7/1997 | Kreidl ......................... | 710/305 |
| 5,675,584 | A * | 10/1997 | Jeong .......................... | 370/284 |
| 5,734,920 | A * | 3/1998 | Gotoh et al. ................. | 710/71 |
| 5,748,887 | A * | 5/1998 | Kim et al. .................... | 714/52 |
| 5,920,706 | A * | 7/1999 | Ono ............................ | 710/106 |
| 2001/0044862 | A1 * | 11/2001 | Mergard et al. .............. | 710/71 |

(Continued)

FOREIGN PATENT DOCUMENTS

DE     102 20 227 A1    5/2004

(Continued)

OTHER PUBLICATIONS

Avery, James M., "Infiniband to PCI Bridge TCA", WGS VLSI Engineering, May 9, 2000, XP002197326.

(Continued)

*Primary Examiner*—Paul R. Myers
(74) *Attorney, Agent, or Firm*—Quarles & Brady LLP; Alexander M. Gerasimow (57) ABSTRACT

A method and a circuit for converting parallel CPU information buses within circuit boards to serial data buses, while limiting overhead data to provide a low-level protocol and high rates of data transfer over distances up to forty inches. Larger scale parallel data buses are converted to serial data by subdividing the buses or buses into a plurality of serial data channels. The invention utilizes high speed serial data circuitry along with custom logic circuits for converting the information on the parallel buses to serial data on the sending end and for re-converting the information to the original parallel data form on the receiving end. The invention can be applied to bi-directional transfer of information and to the connection of a controller circuit board to a plurality of peripheral boards.

20 Claims, 11 Drawing Sheets

U.S. PATENT DOCUMENTS

2002/0122503 A1  9/2002  Agazzi
2003/0056049 A1  3/2003  Kaku
2003/0217215 A1  11/2003 Taborek, Sr. et al.

FOREIGN PATENT DOCUMENTS

WO   WO 01/18654 A   3/2001
WO   WO 01/18989 A   3/2001

OTHER PUBLICATIONS

J. Russel, J. Steczkowski, "Introduction to the InfiniBand Architecture (Rev 1.3)", Crossroads Systems Inc., Apr. 2, 2000, XP002382807.

* cited by examiner

LOW PROTOCOL, HIGH SPEED SERIAL TRANSFER FOR INTRA-BOARD OR INTER-BOARD DATA COMMUNICATION

CROSS-REFERENCE TO RELATED APPLICATIONS

Not applicable

STATEMENT REGARDING FEDERALLY SPONSORED RESEARCH

Not applicable

TECHNICAL FIELD

The field of the invention is electronic and computer equipment of type mounted on circuit boards and disposed on a chassis or in a housing, and a specific embodiment is related to the field of factory automation and motor controls.

BACKGROUND ART

In factory automation and other applications requiring computerized equipment motors, the electronics are supported on circuit boards and mounted to a chassis or in a housing. The circuit boards may have edge connectors that are received in corresponding edge connectors mounted on a backplane motherboard. Or, as seen in personal computer equipment the circuitry may be connected with ribbon cable. Where units are some distance apart, cables or twisted pairs of wires or wireless technologies can be used to transmit data through a serial data communication channel according to serial data protocols.

The present invention is concerned with information buses that extend across a physical medium either on a given board or between boards. In this context, the "information" category may be defined as including subcategories of more specific information, such as address information, data information or control information. Today, information bus widths are increasing from 32 bits to 64 bits and even to 128 bits. In parallel signal paths running at high speed, there is a problem concerning "data latency," where not all of the signals arrives at the destination within a time window defined for capture and processing.

In electrically noisy environments, data latency can be a problem for buses operating at speeds as low as 20 MHz. As the speed of microelectronic CPU's has increased to 500 MHz and even greater than 1 GHz, the transport of data and densities across connectors can cause severe problems in data latency and result in cost disadvantages. Data transfer at these speeds can have the effect of limiting bus lengths to a few inches, which limits the circuitry that can communicate on such buses.

Most serial data interface implementations require protocols, which are organizations of data into strings of defined bytes that can be sorted out and identified at the receiving end. Many protocol standards and specifications are provided for use today for serial communications. Some examples are Rapid I/O, USB, Firewire and others.

These protocols will contain overhead in the form of identification data, command data, error detection data, and other information. The true performance of the serial channel is reduced depending on the overhead required by the protocol. Two characteristics of a serial channel called bit rate and bandwidth provide a measure of performance. The bit rate is the clock rate of the data stream which contains all frames of information including the substantive application data. The bandwidth is the data transfer speed that reflects how much of this data is transported in an interval of time. The frames of information that there are in addition to the substantive application data represent overhead in the serial data stream. Due to this overhead, the data bandwidth never reaches the serial bit rate. For example; a message with four (4) bytes of application data may require four (4) additional bytes of information such as address, commands and data checking (validation). The total is eight (8) bytes and assuming an 8 Mb serial data rate, the maximum transfer rate would be 1 million 8-byte messages per second or a 4 Mb data bandwidth. Without the extra information, the bandwidth would be 8 Mb. In this case the bandwidth is 50% of the serial bit rate.

With the present invention, the bandwidth is increased to 67% of the serial bit rate.

SUMMARY OF THE INVENTION

The invention relates to a method and a circuit for converting parallel information buses within circuit boards to serial data buses and then re-forming the parallel data, using a low-level serial data protocol without overhead frames. With this approach, bus distances can be increased for high speeds from three up to forty inches. Also, the information bandwidth will be increased.

It is a further aspect of the invention that larger scale parallel data buses can be converted to serial data by subdividing the buses into a plurality of serial data channels. The invention utilizes high speed serial data circuitry along with custom logic circuits for converting the information on the parallel buses to serial data on the sending end and for re-converting the information to the original parallel data form on the receiving end. The invention can be applied to bi-directional transfer of information and to the connection of a controller circuit board to a plurality of peripheral boards.

In one embodiment, the method of the invention is practiced by receiving the parallel address, data and control bus information near the microelectronic CPU and converting that information to serial data information in a plurality of serial data streams, and transmitting the serial data streams to circuitry near the destination and converting the serial data streams to parallel address, data and control bus information to reconstitute the microelectronic CPU information buses as peripheral information buses. The serial data streams are transparent to the peripheral devices which may be connected to the peripheral information buses. Also, the converting of said information to the serial data streams to parallel address, data and control bus information is carried out without assistance by a second CPU.

The circuitry of the invention includes first storage circuits for receiving the parallel address, data and control bus information near the microelectronic CPU, first conversion circuits for converting the information to serial data information in a plurality of serial data streams and transmitting the serial data streams to circuitry near the destination, second conversion circuits for converting the serial data streams to parallel address, data and control bus information, and address, data and control bus information to reconstitute the microelectronic CPU information buses or peripheral information buses.

Various objects and advantages of the invention will be apparent from the description that follows and from the drawings which illustrate embodiments of the invention, and which are incorporated herein by reference.

DETAILED DESCRIPTION OF THE PREFERRED EMBODIMENTS

Figure 1:
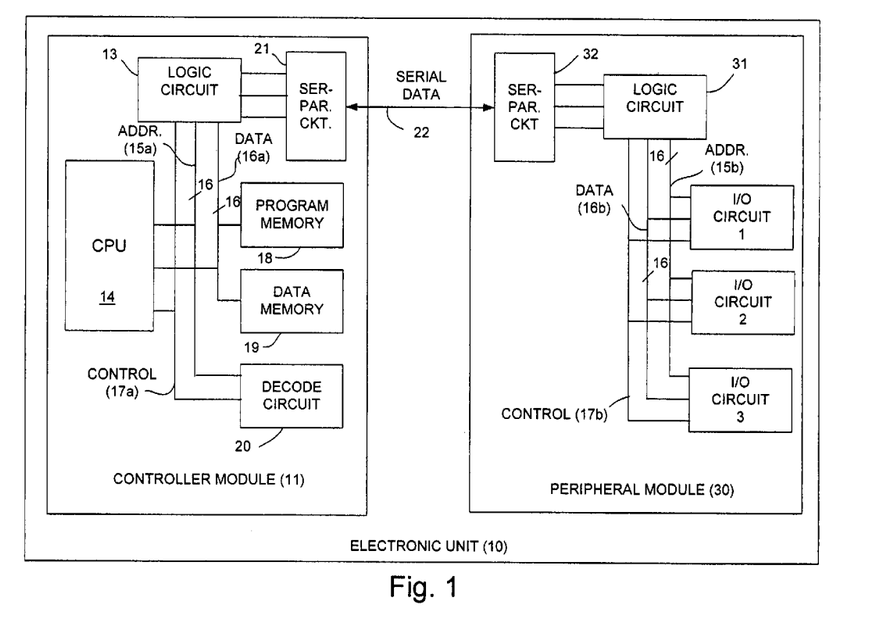
FIG. 1 is a block diagram illustrating one preferred embodiment of a circuit for practicing the present invention.

Referring to FIG. 1, an electronic unit 10, in this embodiment a motor drive, includes a controller module 11 and a peripheral module 30, which in this embodiment are mounted on different circuit boards. In other embodiments, they could be located on one individual circuit board.

The controller module 11 has a microelectronic CPU 14 with address, data and control buses 15a, 16a and 17a, for transmitting signals to a logic circuit 13, to memories 18 and 19, to a chip select decoding circuit 20 and to a high speed serial-parallel data conversion circuit 21. The serial-parallel data conversion circuit 21 communicates through a high speed serial data link 22 to the peripheral module 30. The memories 18, 19 include a program memory 18 which stores program instructions for carrying out the operations of the CPU 14 and a data memory 19 for storing application data and temporary results.

The peripheral module 30 includes a logic circuit 31 and a high speed serial-parallel data conversion circuit 32 for communicating data on the high speed serial data link 22. The output from the serial-parallel data conversion circuit 32 will be functionally the same address, data and control buses 15b, 16b and 17b that were present on the controller module 11, but at a greater distance from the CPU 14. The lines in these buses 15b, 16b and 17b will connect to functional circuits on the peripheral module 30 which may include a peripheral CPU, however such a CPU will not function in any way in re-forming the address, data and control buses 15', 16' and 17' of the microelectronic CPU 14.

Figure 2:
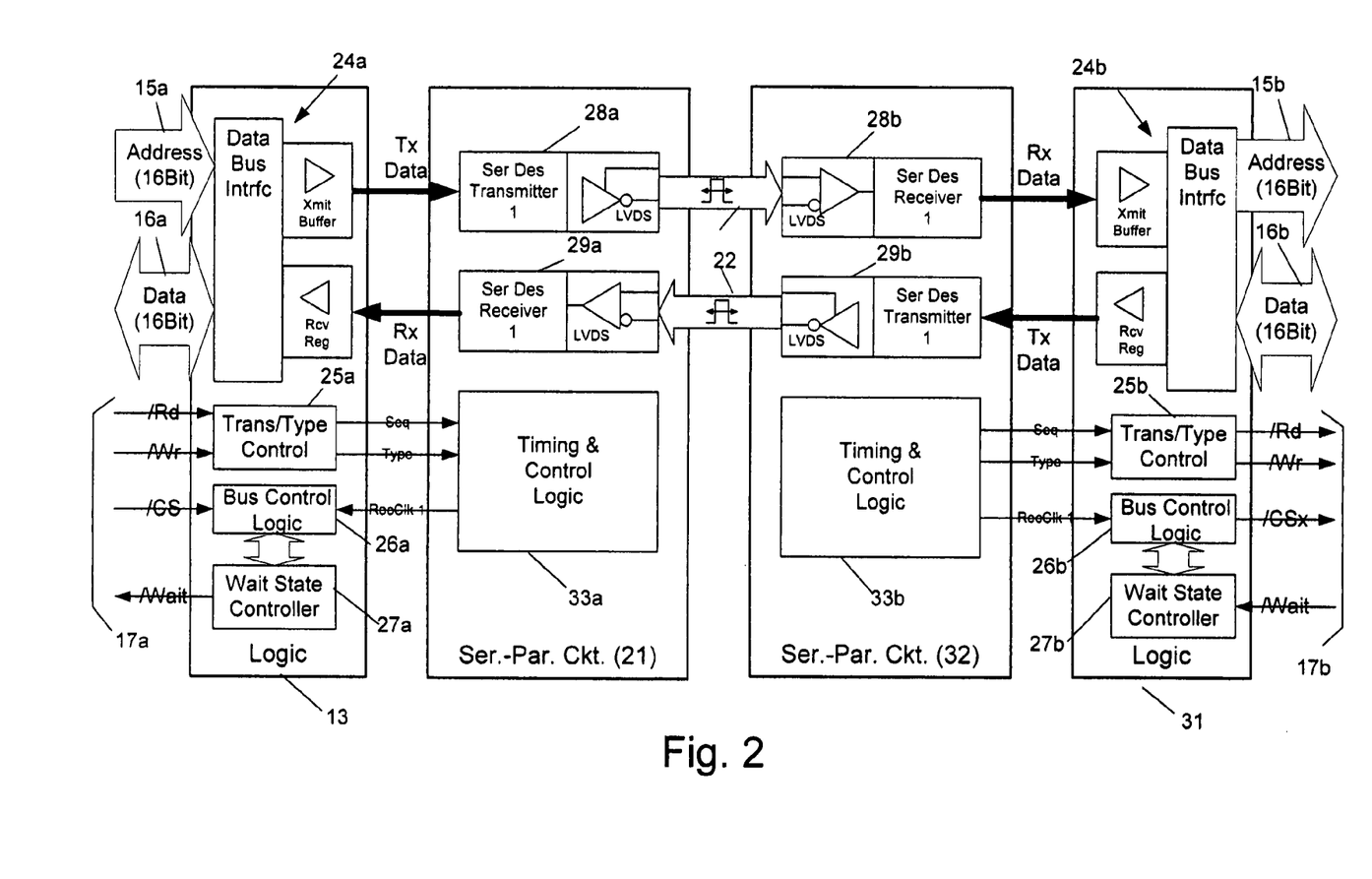
FIG. 2 is a more detailed block diagram of the circuits seen in FIG. 1.

FIG. 2 shows the details of the logic circuits 13, 31 and the serial-parallel conversion circuits 21, 32 seen in FIG. 1. The CPU data bus 16a is connected to the logic circuit 13. The data bus 16 is serialized, transferred to the opposite side (inter-board or board to board) through the serial data link 22, and then reconverted to parallel data. The logic circuit 32 re-forms the CPU data bus 16b.

As a result, the CPU 14 communicates to peripherals on external boards as if they are directly connected and physically located next to the CPU 14.

As seen in FIG. 2, the logic circuit 13 more particularly includes a bus interface circuit 24a with transmit buffers and receive registers, a transaction/type control circuit 25a, bus control logic 26a and a wait state controller 27a. These circuits 25a–27a receive the read (RD), write (WR), chip select (CS) signals and generate wait state signals which form the CPU control bus 17.

The serial-parallel data conversion circuit 21 more particularly includes a LVDS (low voltage differential signaling) serial channel transmitter 28a, and a LVDS serial channel receiver 29a. The transmit data comes into the circuit 28a as parallel data and is converted to serial data. The receive data comes into the circuit 29a as serial data and is converted to parallel data. The serial-parallel data conversion circuit 21 also includes a timing and control logic section 33a, which receives transaction sequencing and type signals from the transaction/type control circuit 25a and incorporates these in the serial data. This circuit 25a also generates receive clock signal (Rec Clk 1) to help the timing of data being read by the CPU 14.

On the other side of the serial data link 22, the serial-parallel conversion circuit 32 has a LVDS (low voltage differential signaling) serial channel transmitter 28b, and a LVDS serial channel receiver 29b. The serial-parallel data conversion circuit 32 also includes a timing and control logic section 33b, which extracts transaction sequencing and type signals from the serial data and passes these signals to a transaction type control circuit 25b which further controls read and write control signals in the control bus 17b. The serial-parallel conversion circuit 32 includes a bus interface circuit 24b with transmit buffers and receive registers, a transaction/type control circuit 25b, bus control logic 26b and a wait state controller 27b similar to circuit 13.

Figure 3A:
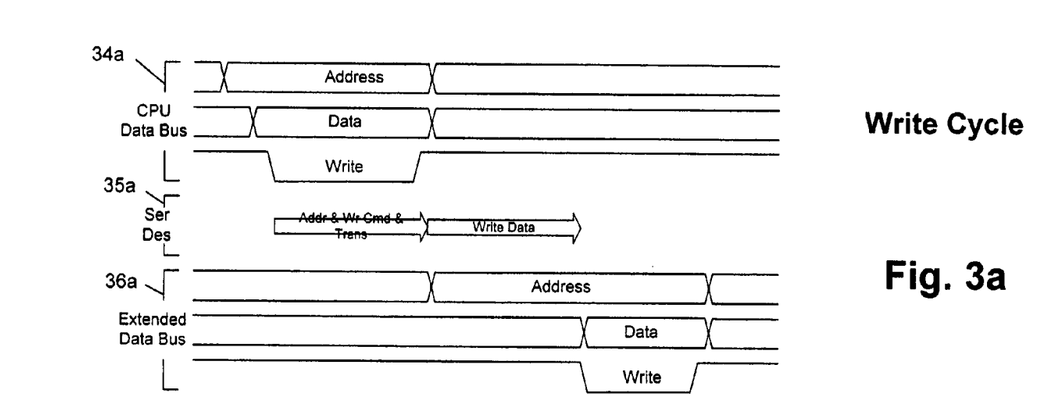
FIGS. 3a and 3b are generalized timing diagrams for reading and writing data in the embodiments of FIGS. 1 and 2.
Figure 3B:
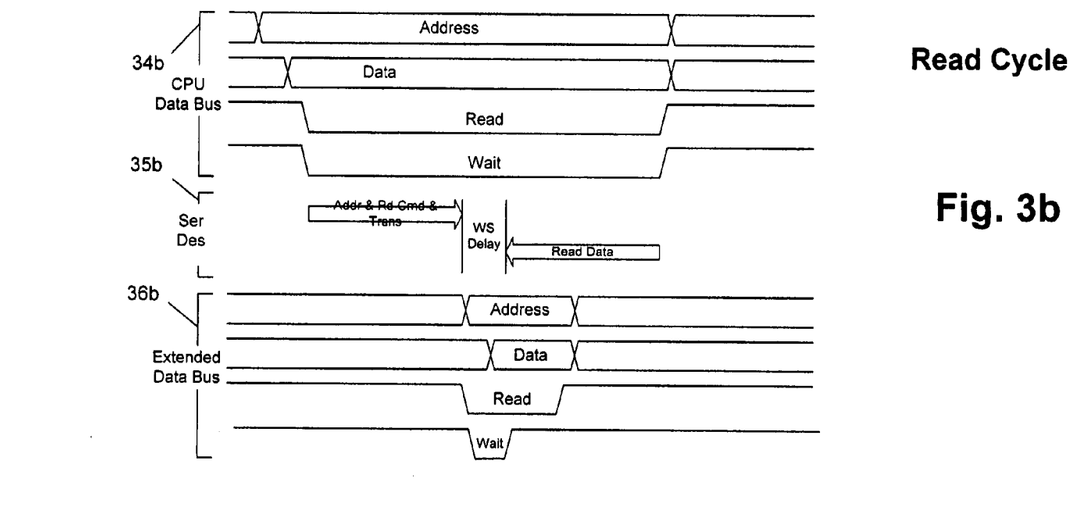

FIGS. 3a and 3b show the timing of the data transfer in the circuit of FIGS. 1 and 2. FIG. 3a illustrates timing signals 34a for a typical CPU data bus in the write data transfer. The SerDes portion 35a in FIG. 3a represents the signals being transmitted through the serial data link 22. The extended data bus portion 36a shows how the CPU bus signals are re-formed in buses 15b, 16b and 17b. It is to be noticed that the write cycle first takes place during the logic low active state of the write signal. During that time, the serial-parallel conversion circuit 21 generates control signals, places them in the write data and transmits the write data through the serial data link 22. After it is received and converted to parallel data by circuit 31, the data is finally written out to the extended data bus 16b as shown by signals 36a.

As seen in FIG. 3a, for a write transfer, the CPU cycle 34a can be completed prior to the peripheral module 30 having received the data 36a. This may have an advantage to allow the CPU 14 to execute the write transfer without any wait state requirements. Of course, the logic then requires a latch to hold the data until the serial-parallel circuit 21 has time to transfer the data. It is also important to realize that the transfer is after the CPU write cycle so some latency is noted.

As seen in FIG. 3b, there are signals 34b on the CPU data bus, signals 35b in the serial-parallel (Serdes) portions of the modules 11, 30, and signals on the extended buses 15b, 16b and 17b. In a CPU read cycle, the CPU data bus 16 must wait for the data to be received from the peripheral module 30. This requires a wait signal to be utilized for this type of transfer. The delay will include serial transport time and the physical wait state delay of the peripheral being addressed.

Figure 6:
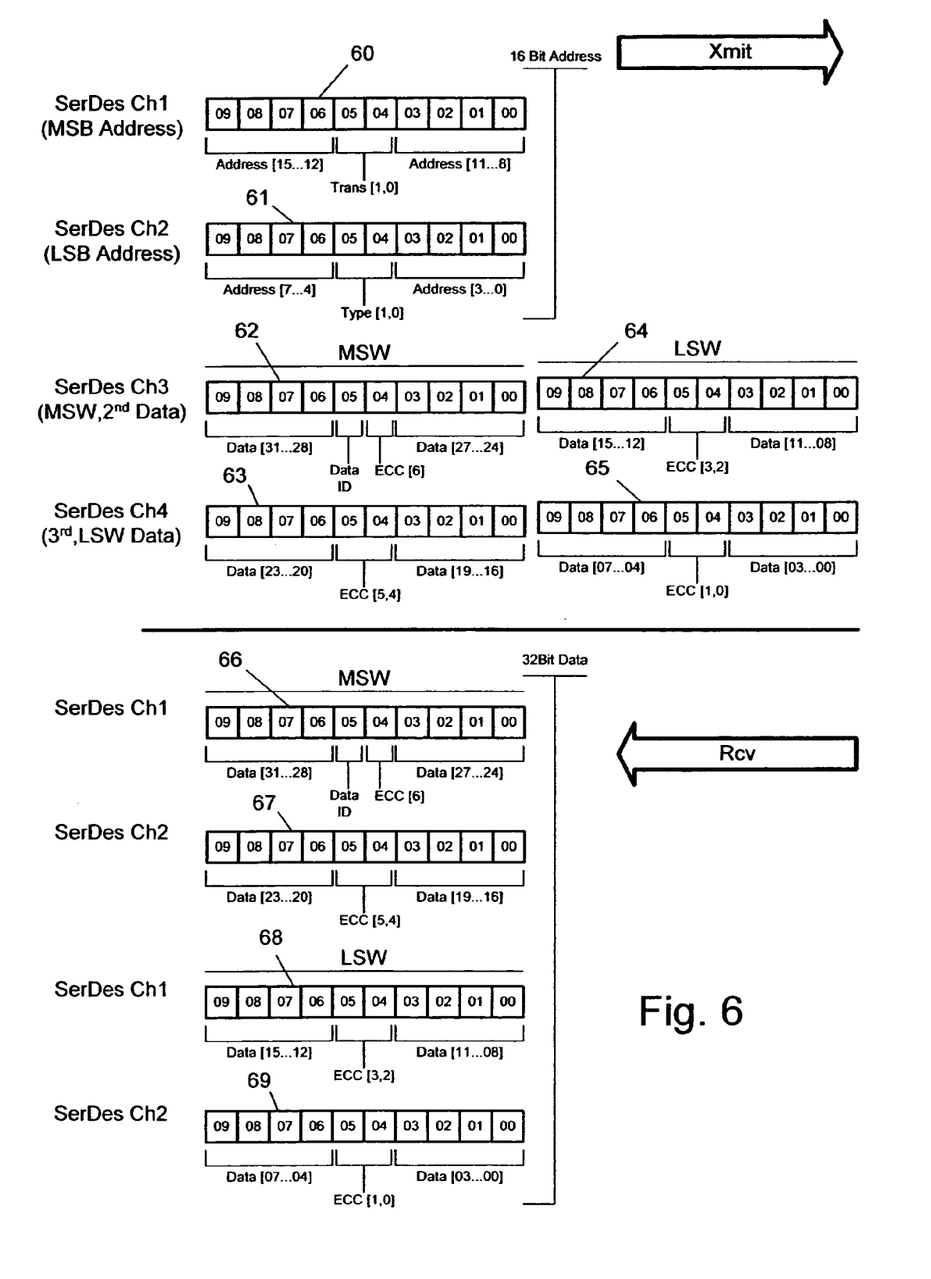
FIG. 6 is a map diagram of the serial data transferred in both directions in FIGS. 1, 2, 4 and 5.

The serial communications on the serial data link 22 provide for continuous streaming of data. In order to remain in synchronization with a peripheral device, communication of data through the serial data link 22 is not started and stopped. To signal when a new transaction is started or completed, small two bits of additional transaction (Trans [1,0]) information are embedded within the message data stream in the most significant byte (MSB) of address frame 60 as seen in FIG. 6. The transaction sequence is simply 0, 1, 2, 3 and then restarts at 0 again so that each new transfer can be identified. Otherwise, data would be transferred and requested continuously without knowing when the data is complete and to complete the data transfer with the CPU (especially for a Read cycle). It is noted here that each frame of data in FIG. 6 includes ten (10) bits of information (plus a start and stop bit that are not shown). After subtracting two bits of control data, the result is eight bits of information from the CPU buses, so reference to MSB (most significant byte) and LSB (least significant byte) identifies these frames by according to the sequence in transferring 16-bit words of information.

With the low level of protocol information (2 bits per frame) seen in FIG. 6, command information can be embedded into the message as part of the address. One bit is enough to determine whether the transaction is a write or a read from one peripheral board, but in this case two bits can be used to signal four possible transactions with additional boards in a multi-drop configuration seen in FIG. 7.

By embedding command information, such as Type information (see LSB address in FIG. 6) with the least significant byte (LSB) of address information, the type of transfer can be synchronized with the reception of the address to determine whether a write (CPU output) or read (CPU input) transfer is being signaled.

As seen further in FIG. 6, the low-level protocol provides for embedding up to seven bits of error correction code (ECC 0–6) data in the 10-bit frames of information being transmitted over the serial data link 22. The number of bits of error correction code needed depends on the size of data transfer and seven bits is sufficient for transferring and validating 32 bits of data.

Figure 7:
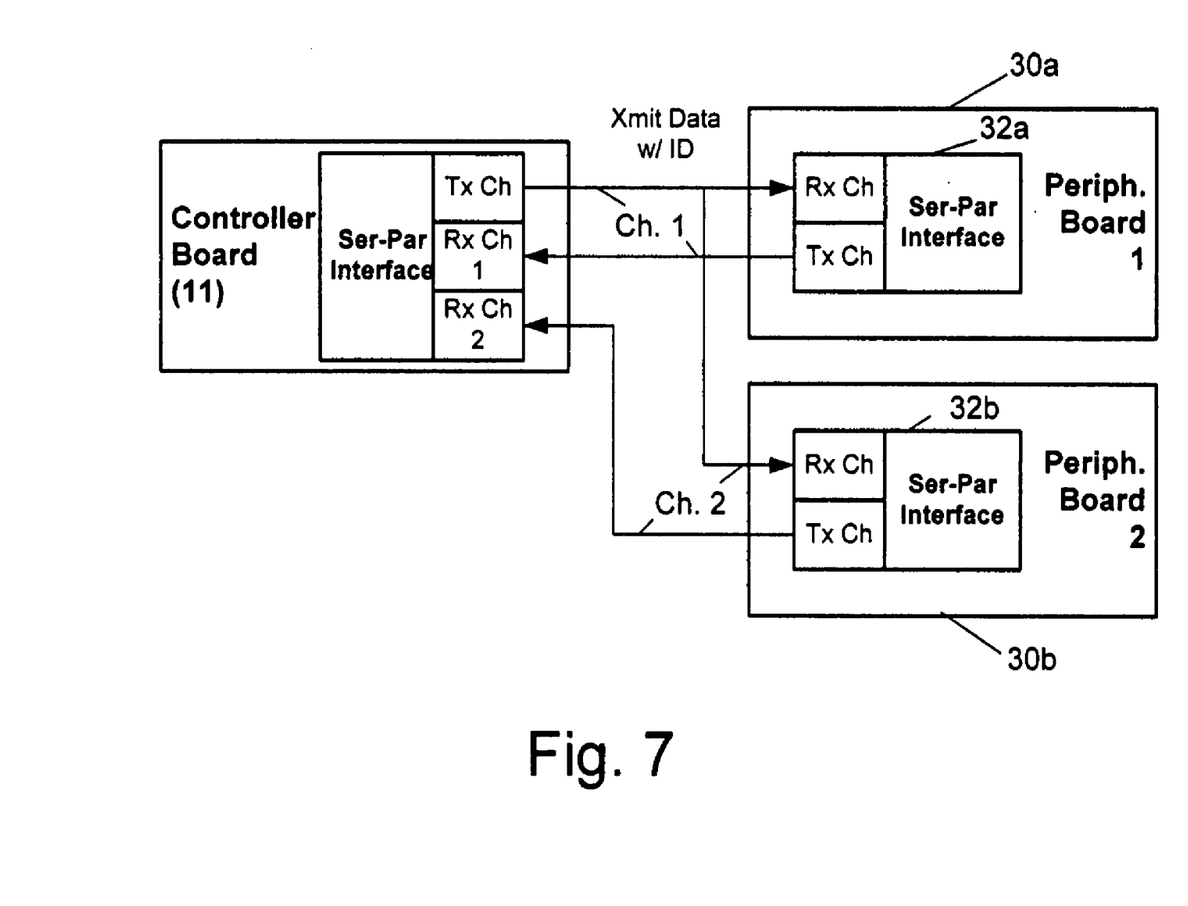
FIG. 7 shows the invention applied to a multi-drop configuration with two peripheral circuit boards.

FIG. 7 illustrates a multi-drop (to two peripheral circuit boards) configuration. As an alternative to increasing the serial data rate to improve performance, a second serial data channel (Ch. 2) can be added. This can allows for respective serial data channels between the controller board 11 and the peripheral boards 30*a* and 30*b*. The peripheral boards 30*a* and 30*b* each have their own serial interface and receive and transmit circuits 32*a*, 32*b*. In the write direction, address and data can be transferred at the same time, thus reducing the serial transport latency by half. With the use an additional receive channel (Ch. 2), the controller 11 can communicate with different peripheral boards 30*a* and 30*b* using the same serial interface circuits assisted by two bi-directional serial data channels (Ch. 1, Ch. 2).

Figure 4:
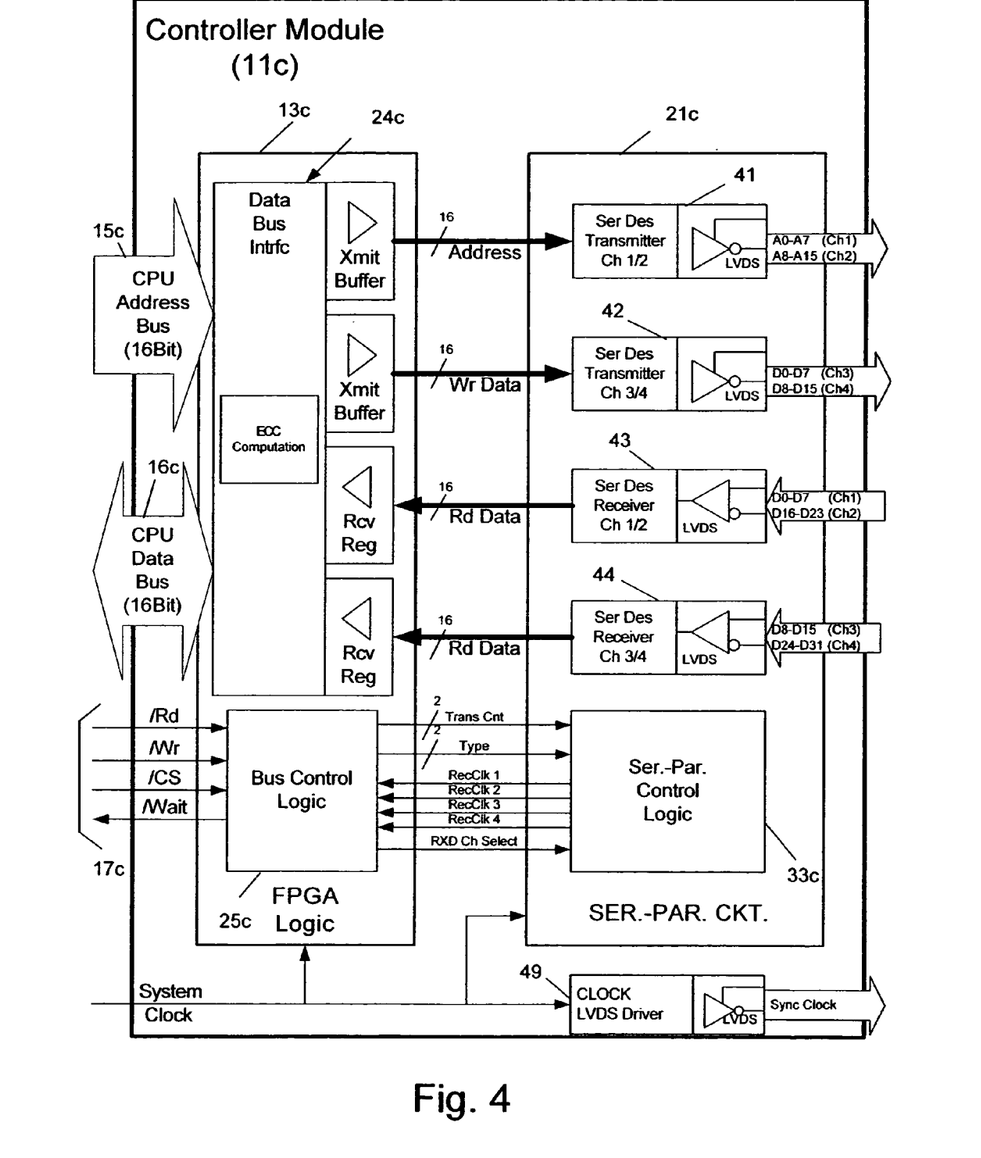
FIGS. 4 and 5 are more detailed block diagrams of circuits seen FIG. 1 for a thirty-two bit data bus embodiment.

FIG. 4 shows the details of a logic circuit 13*c* and a high speed parallel-to-serial data conversion circuit 21*c* for a multi-serial channel embodiment operating at 800 MHz on each channel. The address, control and data buses 15*c*, 16*c* and 17*c* connect to the logic circuit 13*c*, which is a field programmable gate array circuit (FPGA). On the other side of the FPGA 13*a* are a plurality of serial-parallel conversion and serial communication circuits 41–44, the circuits 41, 42 for transmit channels 1–4 transmitting four bytes of data on four half-duplex serial output channels, and the circuits 43–44 for receive channels 1–4 for receiving four bytes of input data on four half-duplex serial input channels.

The transmit portions of the four serial data channels 41, 42 are used for sixteen bits of address data, and for sixteen bits of write address data, respectively. The receive portions of two serial data channels 43 are used for sixteen bits of read address data. The receive portions 44 of serial data channels 3 and 4 are used for a second sixteen bits of read address data for a total of thirty-two bits of read address data.

The last two receive channels 44 can be used for serial read streaming data or regular receive data. Because the CPU 14 in this example uses a 16-bit data bus, sending 32-bit data in four simultaneous transfers gets the data back but does not speed the read cycles of the CPU data bus 16*a*. After the first sixteen bits are received, the CPU 14 can continue the cycle. By the time the second cycle for the last sixteen bits is requested, the data is already received. If the data bus was 32 bits wide then implementing a 4-channel receive data would in fact improve the performance of the serial interface.

The logic circuit 13, 13*c* for both FIGS. 2 and 4 is provided in one Altera Cyclone EP1C12 FPGA (Field Programmable Gate Array). although other specific commercial circuits could also be used. The logic circuit 13, 13*c* is responsible for coordinating the serial data interface activities between the main CPU 14 and the peripheral module 30*c*. The precise internal logic would vary according to which specific parallel-to-serial circuitry unit was chosen from a one of several suppliers, however, the functions described herein would still apply. The following are the functions performed for this logic circuit 13, 13*c*.

The FPGA 13*c* includes a CPU data bus interface portion 24*c* that provides a bi-directional tri-state interface to the main CPU 14 with a data bus width of 16 bits. It uses the typical complement of control signals which include Address bits A0 thru 15, Data bits D0 thru D15, read, write, CS (chip select), and Wait.

The CPU data bus interface portion 24*c* also includes storage registers for storing transmit data and receive data, which is necessary to coordinate the discrete CPU data with the continuous data streaming of the serial-parallel data conversion circuit 21*a*. Data registers are used for the temporary retention of this information until needed.

The FPGA 13*c* also includes a transaction control section (not shown). Based upon the data transfer cycle being performed by the CPU 14, this logic determines and transfers the appropriate bit signals for establishing the Command Type (RD or WR) and the Data Sequence (most significant word, least significant word—16 bits each). This information is stored with the address and data register latch and is transferred to the serial-parallel data conversion circuit 21*c* as timing requires.

The FPGA 13*c* also includes a bus control logic portion 25*c* that controls the state sequencing of operation of the serial-parallel data conversion circuit 21*c*. The logic interfaces with the Receive Clock signals (for determining when data is available) of the serial-parallel data conversion circuit 21*a* and coordinating the transfer cycle that includes storing data in the registers, starting cycles based upon chip select activation, control of wait signal for holding off the CPU 14 and accumulating and evaluating error conditions.

The data bus interface section 24*c* also includes an Error Checking and Correction (ECC) portion. This is an optional feature. This logic block will perform the ECC generation, checking, and correction of the data transferred. The implementation could be of several types depending on the integrity desired. The present implementation includes a modified Hamming Code (distance=4) to allow SECDED (single error correction double error detection). This implementation will allow good reliability yet reduce the amount of logic and delay time associated with it.

The serial-parallel data conversion circuit 21*c* performs high speed bit rate clocking (Phase-locked loop), the serialization and transmitting of transmitting data, the de-serialization of receiving data, CDR (Clock Data Recovery, LVDS interfaces (Rx and Tx), and data encoding-decoding. This section interfaces to the FPGA 13*c*. In this application, a 66.6666 MHz clock 49 drives the phase-locked loop that multiplies the frequency by 12 (12-bit encoding scheme) for a baud frequency of 800 MHz. In other embodiments, the clock rate can be stepped up to 3.2 Ghz. The parallel to serial converter section is a single chip device manufactured by Lattice Semiconductor, of Hillsboro, Oreg. , as part number GDX2-128.

Since the clock data recovery portion of the serial-parallel data conversion circuit 21c may not adequately keep synchronization of the data stream in this environment, a separate clock and LVDS clock driver was added to this block to insure synchronous operation. This required another LVDS channel to be transported across the interface. This may be removed in some embodiments.

On the peripheral module 30d (FIG. 5) there is a second serial-parallel converter circuit 32d. This circuit 32d includes the high speed bit rate clocking (PLL), the serialization of transmitting parallel data, de-serialization of receiving data, CDR (Clock Data Recovery, LVDS interfaces (Rx and Tx), and data encoding-decoding. This circuit 32d interfaces to a peripheral module logic circuit 31d provided by a second FPGA. In this application, a 66.6666 MHz clock 49a drives the PLL that multiplies the frequency by 12 (12-bit encoding scheme) for a frequency of 800 MHz. In other embodiments, the clock rate can be stepped up to 3.2 Ghz. The second serial-parallel converter circuit 32a is also a single chip device manufactured by Lattice Semiconductor as part number GDX2-128.

Figure 5:
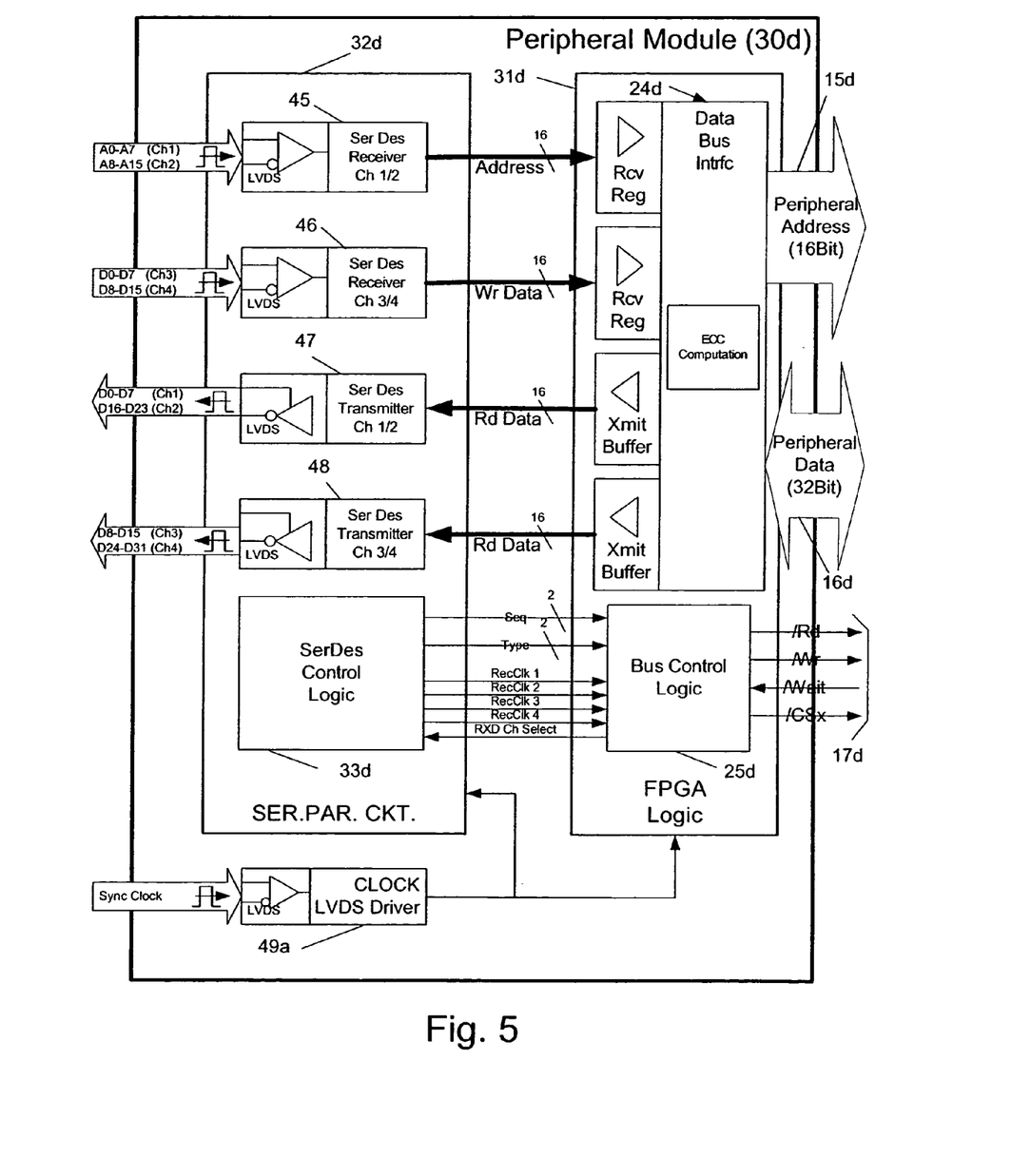

The second FPGA 31d is provided in one Altera Cyclone EP1C12 FPGA (Field Programmable Gate Array), although other specific commercial circuits could also be used. The logic block is responsible for coordinating the serial data interface activities between the serial channels and the peripheral module 30d. The precise internal logic would vary according to which specific parallel-to-serial circuitry unit was chosen from a one of several suppliers, however, the functions described herein would still apply. This logic block is responsible for re-creating the timing and operational signals for the reproduced data bus on the remote end of the interface. The following are the functions performed for this logic block.

The second FPGA 31d includes a peripheral bus interface section 24d. This logic provides a bi-directional tri-state interface to the peripherals connected to the data bus 16d. The re-generated data bus width of thirty-two (32) bits. It uses the typical complement of control signals which include Address A0 thru 15, Data D0 thru D15, read, write, chip select, and wait.

The second FPGA 31d includes storage registers for storing transmit data and receive data. Since the data transfers to peripheral circuits would not be synchronized with the continuous data streaming of the parallel-serial conversion unit, data registers are used for the temporary retention of this information until data is available or transfer cycles are completed.

The second FPGA 31d includes a transaction control section (not shown) to determine the appropriate bit signals to be activated (RD or WR) and when the chip select outputs are active. This transaction information is received with the address and data frames and is transferred from the parallel-to-serial conversion circuit 32d as timing requires.

The second FPGA 31d includes a bus control section 25d. This portion of the logic controls the state sequencing of operation of the parallel-to-serial conversion circuit 32d. The logic interfaces with the Receive Clock signals (for determining when data is available) of the parallel-to-serial conversion circuit and coordinating the transfer cycle that includes storing data in the registers, starting cycles based upon chip select activation, and monitoring of wait signal for generating return data sent back to the Host CPU.

The second FPGA 31d includes error code checking and correction (ECC) circuitry. This logic block will perform the error code generation, checking, and correction of the data transferred. The present implementation includes a modified Hamming Code (distance=4) to allow SECDED (single error correction double error detection) This implementation will allow good reliability yet reduce the amount of logic and delay time associated with it. The controller and peripheral ECC circuits would be required to check receive data and correct for errors as well as generate the ECC bits for transmitted data.

FIG. 6 illustrates the format of the serial data that is transferred in the write direction and the read direction from the CPU 14 to the peripheral module 12. In the present embodiments, a 10-bit/12-bit (10 bits of information/12 bits total) encoding/decoding format is used to provide a start bit, a stop bit and ten bits of data per frame transfer. For each ten bits of data, two bits can be used for transaction control, type, ID and ECC bit data.

FIG. 6 shows six frames 60–65 for transmitting information as follows: most significant byte of address 60 (on Serial Data Channel 1), least significant byte of address 61 (on Serial Data Channel 2), most significant half of the first data word 62 (on Serial Data Channel 3), least significant half of the first data word 63 (on Serial Data Channel 4), most significant half of the second data word 64 (on Serial Data Channel 3), and the least significant half of the second data word 65 (serial channel 4).

In FIG. 6, the placement of the bits within the frame are shown. It is important to note that when transferring a serial data stream, that changing bits as often as possible aids in the synchronization of the data streams between serial-parallel conversion units. That is why the selected embedded bits are in the middle of the 10-bit data frame. The embedded bits can be defined to maximize the bit transitions.

The most-significant-byte-of-address frame 60 includes the two bits with a transaction number from 00 to 03 which identifies this frame as new from the frame previously sent through that channel. Data is continually being sent whether or not any new information is being transferred or requested.

For the transaction number, the two bits are count from 00 to 03 and the turn over and repeat. If necessary, the same 01 and 10 pattern can be used. Every other transaction would be repeated with the same number. This specific design is utilizing a repeating one of four count.

The least-significant-byte-of-address frame 61 includes the two bits with a type number from 00 to 03 in which a read type is 01 and a write type as 10. This allows a transition to maximize the synch of the serial to parallel circuits. In a multi-drop configuration, when the a further read type can be defined as 00 and a further write type can be defined as 11.

The bottom portion of FIG. 6 shows the following four frames 66–69 for reading 32 bits of data on Channels 1 and 2 in response to address frames 60 and 61: most significant byte of first word of read data 66, least significant byte of first word of read data 67, most significant byte of second word of read data word 68, least significant byte of second word of read data word 69. All of these are received on read channels 1 and 2. It is also possible to receive a second 32-bit word of read data on read channels 3–4.

In the read data frame(s), information that is embedded in bits 04 and 05 is the data identifier (ID) and the ECC bits. This enables the remote units to identify the proper order of data and the change of frame to indicate this is new from the previous data stream transfer. In this embodiment, the data width being transferred is 32 bits. In this embodiment, the available embedded bits (8−1=7) matches exactly with the 7-bit requirement for ECC on a 32-bit data value.

FIGS. 8–11 illustrate the timing sequences for a Write Data Transfer and a Read Data Transfer between the controller CPU 14 and the peripheral module 30d.

The write cycle is simpler and less intrusive to the CPU performance than the read cycle. The CPU is required to transfer a 32-bit word (MSW 16-bit word and LSW 16-bit word in the FPGA section) to the parallel-serial interface. The CPU address A0–A15, data D0–D15, chip select (/CS) and write (/WR) signals, as well as the external synchronizing clock signals are seen in the top portion of FIG. 8. The next portion shows the signals generated through by the FPGA including alternating valid time frames for address and data, the generation of signals for a write transaction, including the generation of a new sequence number and the write data. The bottom two graphs in FIG. 8 show the times when the address and data are generated on the serial data link 22 by the serial-parallel conversion circuit 21d.

Figure 9:
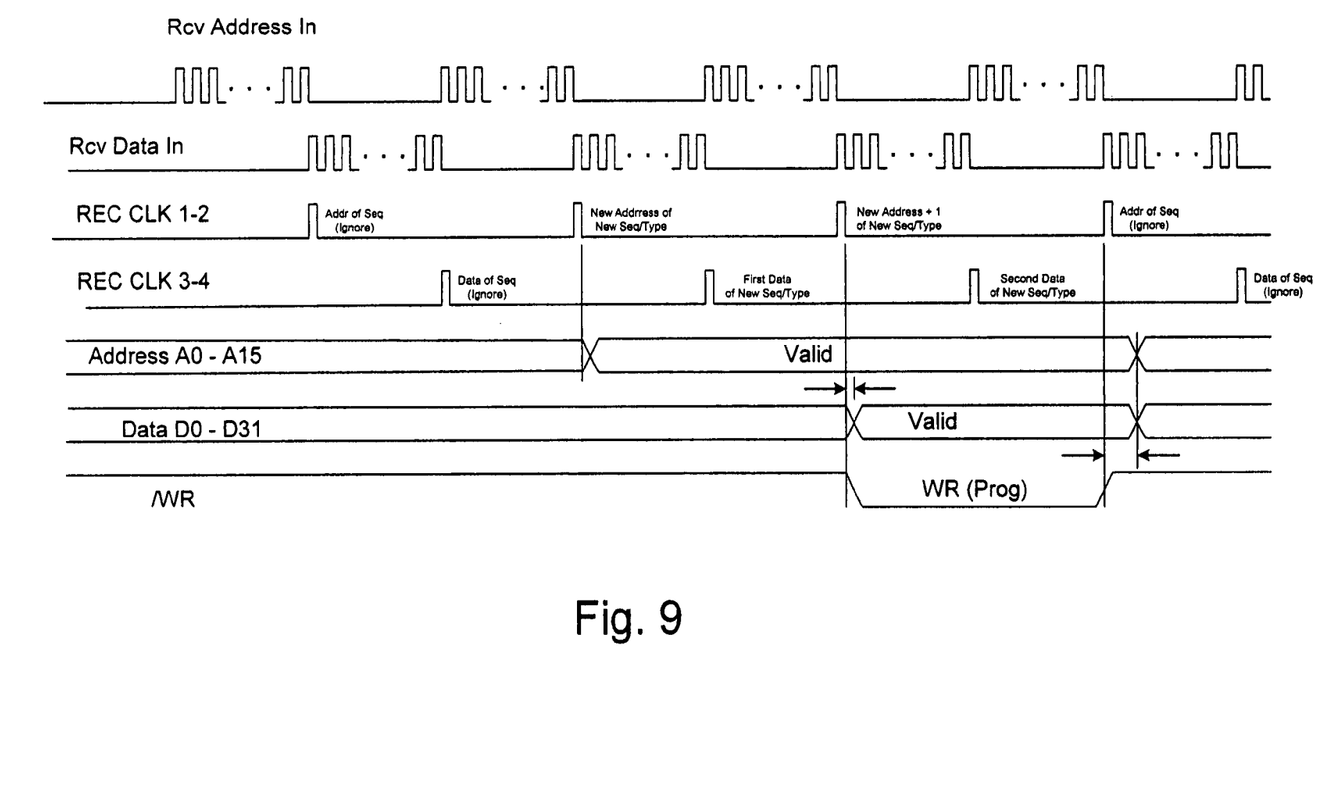

The first four lines of FIG. 9 shows the timing of the signals processed by the second serial-parallel conversion circuit 32d, and finally the bottom three lines show the address and data being signaled on the extended buses 15d, 16d.

During the transfer process, data streaming continues to be received or sent from/to the controller module 11. When a new Write cycle is activated, the sequence number is changed to that the peripheral module 30d can detect that this is a new transaction and not the same data that was previously sent. Another approach to identifying data is the idle packet approach. This could be used in alternative embodiments, but is not preferred, because it might introduce latency into the data transfer. During the data transfer portion of the data streaming in the preferred embodiment, the ID bit is used to specify whether the received data is the most significant 16 bits or the least significant 16 bits.

Figure 8:
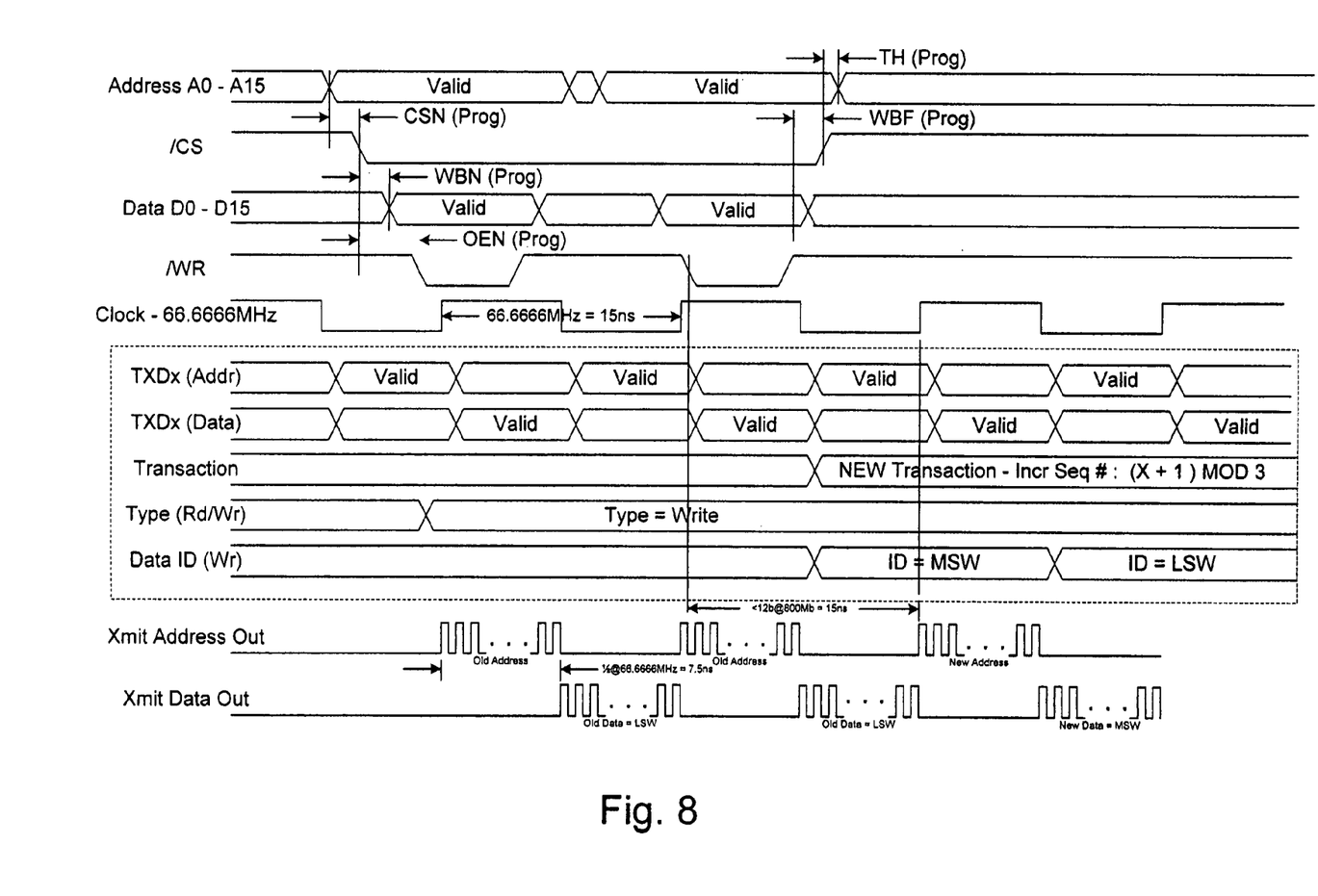
FIGS. 8–11 are more detailed timing diagrams of the information transfer within the circuits of FIGS. 4 and 5.
Figure 10:
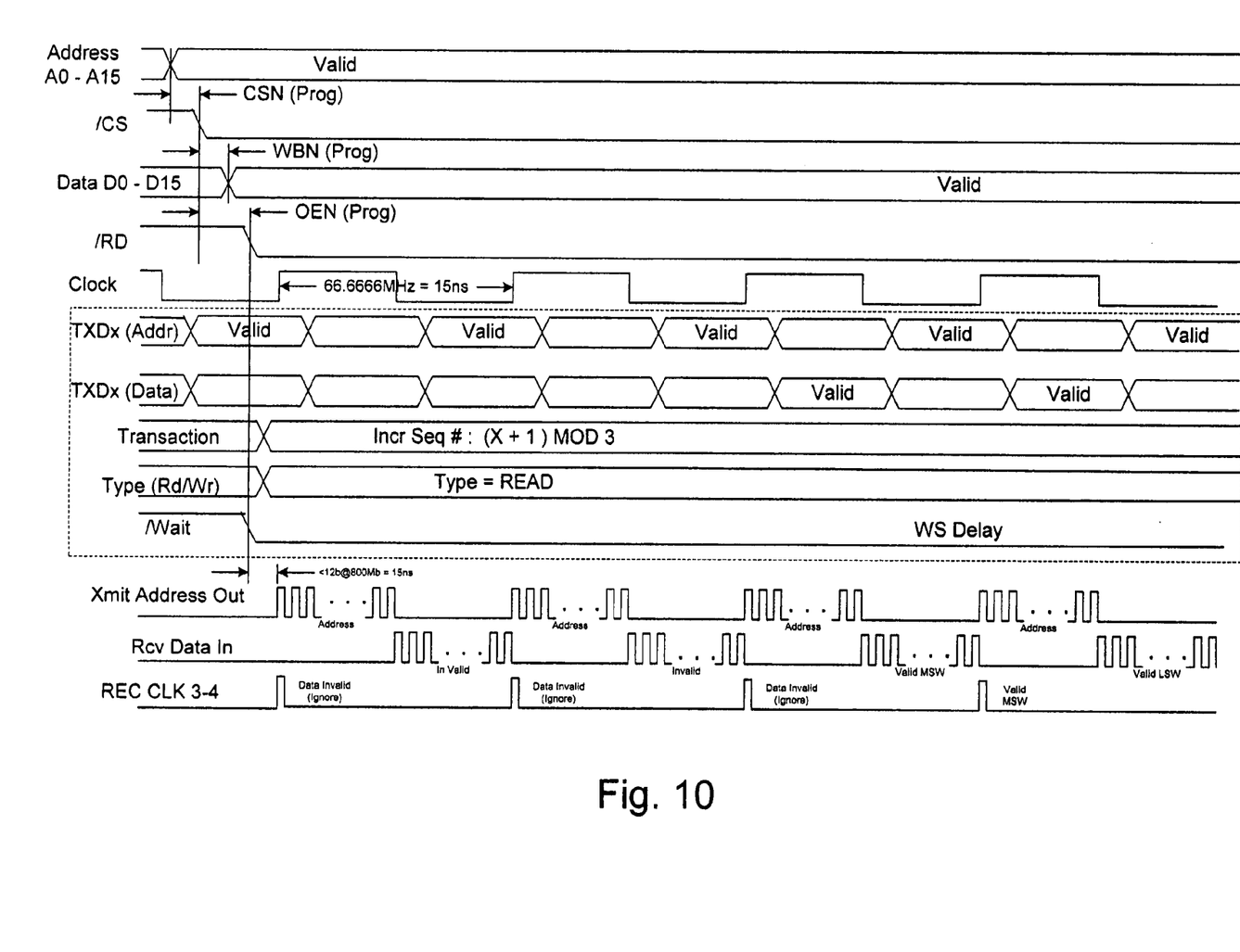

In FIG. 10, the CPU signals for a ready cycle are shown including address A0–A15, data D0–D15, chip select (/CS) and read (/RD) signals, as well as the external synchronizing clock signals are seen in the top portion of FIG. 8. The next portion shows the signals generated through by the FPGA including alternating valid time frames for address and data, the generation of signals for a read transaction, including the generation of a new sequence number and a wait (WAIT) signal. The bottom two graphs in FIG. 10 show the times when the address and is generated on the serial data link 22 by the serial-parallel conversion circuit 21c.

Figure 11:
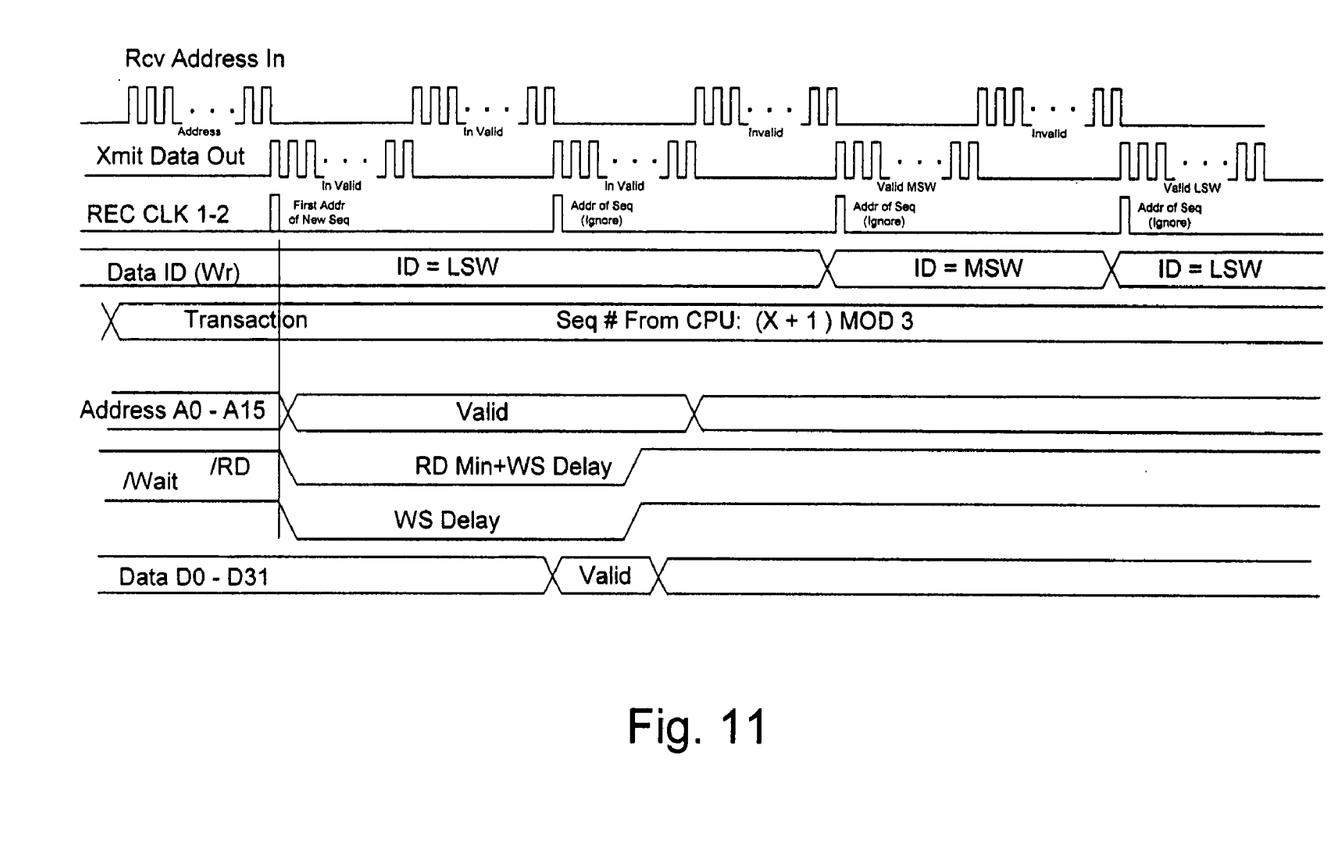

The first four lines of FIG. 11 show the timing of the signals processed by the second serial-parallel conversion circuit 32d to read data, and finally the bottom three lines show the address, the read data and the wait signal being signaled on the extended buses 15d, 16d, 17d.

On the peripheral module 30d, the address is received and a receive clock signal is generated to the logic to save the address. From this data, the logic on the peripheral module 30d will determine whether, the data is write data or read data. Since it is read data, a Read pulse is enabled. After the Wait signal from the remote peripheral is released (data is ready), the data is latched into the FPGA's transmit buffer and the Read signal is deactivated. At the next serial link transfer interval, the first 16 bits (MS) are transferred. Then the second 16 bits (LS) is transferred.

When the controller 11 receives all the data, the Wait signal is de-activated and the first read cycle is concluded. The CPU then repeats the read cycle for the last 16 bits for which the data is available and no Wait signal would be necessary to activate. This is of course unless the data bus bandwidth exceeds the serial link transfer time.

During the transfer process, data streaming continues to be received or sent from/to the controller 1ic. When a new Read cycle is activated, the sequence number is changed to that the peripheral module can detect that this is a new transaction and not the same data that was previously sent. During the data transfer portion of the data streaming, the ID bit is used to specify whether the received data is the most significant 16 bits or the least significant 16 bits.

With the present invention, the buses 15c, 16c, 17c of the CPU 14 can be extended from as few as three inches to up to forty inches without incurring the data latency problems of parallel data buses. The principle can be applied across multiple circuit boards on within one large circuit board. No CPU is required on the peripheral module to help reconstruct the buses.

This has been a description of several preferred embodiments of the invention. It will be apparent that various modifications and details can be varied without departing from the scope and spirit of the invention, and these are intended to come within the scope of the following claims.

I claim:

1. A method for receiving parallel address, data and control bus information from a microelectronic CPU and transferring said information at a transfer rate of at least 800 Mbaud to a destination at a distance of at least three inches from the microelectronic CPU and presenting the data as reconstituted parallel address, data and control bus information for utilization by peripheral devices, the method comprising:

receiving the parallel address, data and control bus information near the microelectronic CPU and converting said information to serial data information in a plurality of serial data streams, including read/write type and transaction number information in the serial data information, wherein the transaction number information changes with each new transfer, transmitting the serial data streams to peripheral circuits near the destination and converting the serial data streams to parallel address, data and control bus information to reconstitute the microelectronic CPU information buses as peripheral information buses, wherein the serial data streams are transparent to the peripheral devices on the peripheral information buses; and wherein the converting of said information from the serial data streams to reconstituted parallel address, data and control bus information extracts the read/write type and the transaction number information to determine the occurrence of a new transaction and to assist in identifying the address and data information received in the serial data streams and is carried out without assistance by a second CPU on the peripheral information buses.

2. The method of claim 1, further comprising:

including error checking information in the serial data streams; and recovering the error checking information near the destination for verifying the data before said information is made available to the peripheral circuits.

3. The method of claim 1, wherein the data bus information received from the processor comprises at least sixteen parallel bits of information; and wherein the data bus information presented to the peripheral devices comprises at least thirty-two parallel bits of information.

4. The method of claim 1, wherein the converting of the serial data streams to parallel address, data and control bus information is performed without the assistance of any microelectronic CPU at the destination.

5. The method of claim 1, wherein the serial data streams have a transfer rate of at least 3.2 Gbaud.

6. The method of claim 1, wherein the specified distance extends up to forty inches from the microelectronic CPU.

7. The method of claim 1, wherein the transmission of the serial data streams to the destination is synchronized by a transfer clock.

8. The method of claim 1, wherein when the serial data streams are received near the destination, receive clock signals are generated to transfer the serial data streams to latches for presentation to the peripheral devices.

9. The method of claim 1, wherein converting said information to serial data information in a plurality of serial data streams is performed using a 12-bit encoding scheme.

10. The method of claim 1, wherein the control bus signals comprise read, write, chip select and wait state signals.

11. A circuit for receiving parallel address, data and control bus information from a microelectronic CPU at a transfer rate of at least 800 Mhz and transferring said information to a destination at a distance of at least three inches from the microelectronic CPU and presenting the data as parallel address, data and control bus information for utilization by peripheral devices, the circuit comprising:

first storage circuits near the microelectronic CPU for receiving the parallel address, data and control bus information;

first conversion circuits for converting said information to serial data information in a plurality of serial data streams and transmitting the serial data streams to circuitry near the destination;

a first control circuit for including read/write type and transaction number information in the serial data information, wherein the transaction number information changes when a new transfer occurs, second conversion circuits for converting the serial data streams to reconstituted parallel address, data and control bus information;

a second control circuit for interfacing with the second conversion circuits for decoding the serial data streams near the destination and extracting the read/write type and the transaction number information to assist in identifying the address and data information received in the serial data streams;

second storage circuits for holding the reconstituted parallel address, data and control bus information to reconstitute the microelectronic CPU information buses;

wherein the serial data streams are transparent to the peripheral devices; and wherein the converting of said information from the serial data streams to the reconstituted parallel address, data and control bus information is carried out without assistance by a second CPU.

12. The circuit of claim 11 wherein:

the first control circuit further includes logic for including error checking information in the serial data streams; and wherein the second control circuit includes logic for recovering the error checking information near the destination for verifying the data before said information is made available to the peripheral devices.

13. The circuit of claim 11, wherein the data bus information received from the processor comprises at least sixteen parallel bits of information; and wherein the data bus information presented to the peripheral devices comprises at least thirty-two parallel bits of information.

14. The circuit of claim 11, wherein the converting of the serial data streams to parallel address, data and control bus information is performed by a hardwired logic circuit without the assistance of any microelectronic CPU at the destination.

15. The circuit of claim 11, wherein the serial data streams have a transfer rate of at least 3.2 Gbaud.

16. The circuit of claim 11, wherein the specified distance extends up to forty inches from the microelectronic CPU.

17. The circuit of claim 11, further comprising a clock circuit that transmits clock signals to the second logic circuit for synchronizing the transmission of the serial data streams to the destination.

18. The circuit of claim 11, wherein when data is received near the destination, the second logic circuit generates receive clock signals to transfer the data to the second storage circuits for access by the peripheral devices.

19. The circuit of claim 11, wherein converting said information to serial data information in a plurality of serial data streams is performed using a 12-bit encoding scheme.

20. The circuit of claim 11, wherein the control bus signals comprise read, write, chip select and wait state signals.

* * * * *